(12) United States Patent
Lee et al.

(10) Patent No.: US 9,769,710 B2
(45) Date of Patent: *Sep. 19, 2017

(54) METHOD AND APPARATUS FOR ACQUIRING CELL IDENTIFIER IN RADIO COMMUNICATION SYSTEM

(71) Applicant: Samsung Electronics Co., Ltd., Suwon-si, Gyeonggi-do (KR)

(72) Inventors: Chung-Keun Lee, Seoul (KR); Young-Don Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,589

(22) Filed: Apr. 11, 2016

(65) Prior Publication Data

US 2016/0227445 A1  Aug. 4, 2016

Related U.S. Application Data

(63) Continuation of application No. 14/219,314, filed on Mar. 19, 2014, now Pat. No. 9,313,724.

(30) Foreign Application Priority Data

Mar. 20, 2013  (KR) ........................ 10-2013-0029667

(51) Int. Cl.
*H04W 36/00* (2009.01)
*H04W 48/16* (2009.01)
*H04W 92/20* (2009.01)

(52) U.S. Cl.
CPC ... *H04W 36/0016* (2013.01); *H04W 36/0061* (2013.01); *H04W 36/0066* (2013.01);
(Continued)

(58) Field of Classification Search
CPC . H04W 48/16; H04W 88/04; H04W 36/0061; H04W 52/0209
(Continued)

(56) References Cited

U.S. PATENT DOCUMENTS

2010/0311407 A1  12/2010 Yao et al.
2011/0013587 A1   1/2011 Serravalle
(Continued)

FOREIGN PATENT DOCUMENTS

WO  2012/177203 A1  12/2012
WO  2013/023171 A1   2/2013
WO  2013/170045 A2  11/2013

OTHER PUBLICATIONS

3GPP; [Draft] LS on Coding of Global Cell id and Global eNB ID; 3GPP TSG RAN WG3 Meeting #61; R3-082362; Aug. 18-22, 2007; Jeju, Korea.
(Continued)

Primary Examiner — Kwasi Karikari
(74) Attorney, Agent, or Firm — Jefferson IP Law, LLP

(57) ABSTRACT

A method for obtaining an identifier of a new cell in a radio communication system is provided. The method includes receiving information associated with the new cell from a user equipment (UE), obtaining an evolved universal terrestrial radio access (EUTRA) cell global identifier (ECGI) of the new cell, if it is determined based on the information associated with the new cell that the new cell is not set as a neighbor cell, determining whether a public land mobile network (PLMN) identifier (ID) (PLMN ID) in the ECGI is included in a relation table including at least one of PLMN IDs and shared PLMN IDs, and receiving an identifier of the new cell from a server, if the PLMN ID in the ECGI is included in the relation table.

14 Claims, 4 Drawing Sheets

(52) U.S. Cl.
CPC ....... *H04W 36/0083* (2013.01); *H04W 48/16* (2013.01); *H04W 92/20* (2013.01)

(58) Field of Classification Search
USPC ........................................ 455/436
See application file for complete search history.

(56) References Cited

U.S. PATENT DOCUMENTS

| | | |
|---|---|---|
| 2011/0263282 A1 | 10/2011 | Rune et al. |
| 2012/0149431 A1 | 6/2012 | Bakker et al. |
| 2012/0178451 A1* | 7/2012 | Kubota ................. H04W 8/00 455/436 |
| 2012/0196617 A1 | 8/2012 | Sun |
| 2012/0208535 A1 | 8/2012 | Martin |
| 2014/0287748 A1* | 9/2014 | Lee ..................... H04W 48/16 455/434 |

OTHER PUBLICATIONS

3GPP; Clarification on the requirement for network sharing; 3GPP TSG-RAN WG3 #74; R3-112900; Nov. 14-18, 2011; San Francisco, CA.

3GPP; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 3GPP TS 36.300 V11.5.0; Mar. 2013.

* cited by examiner

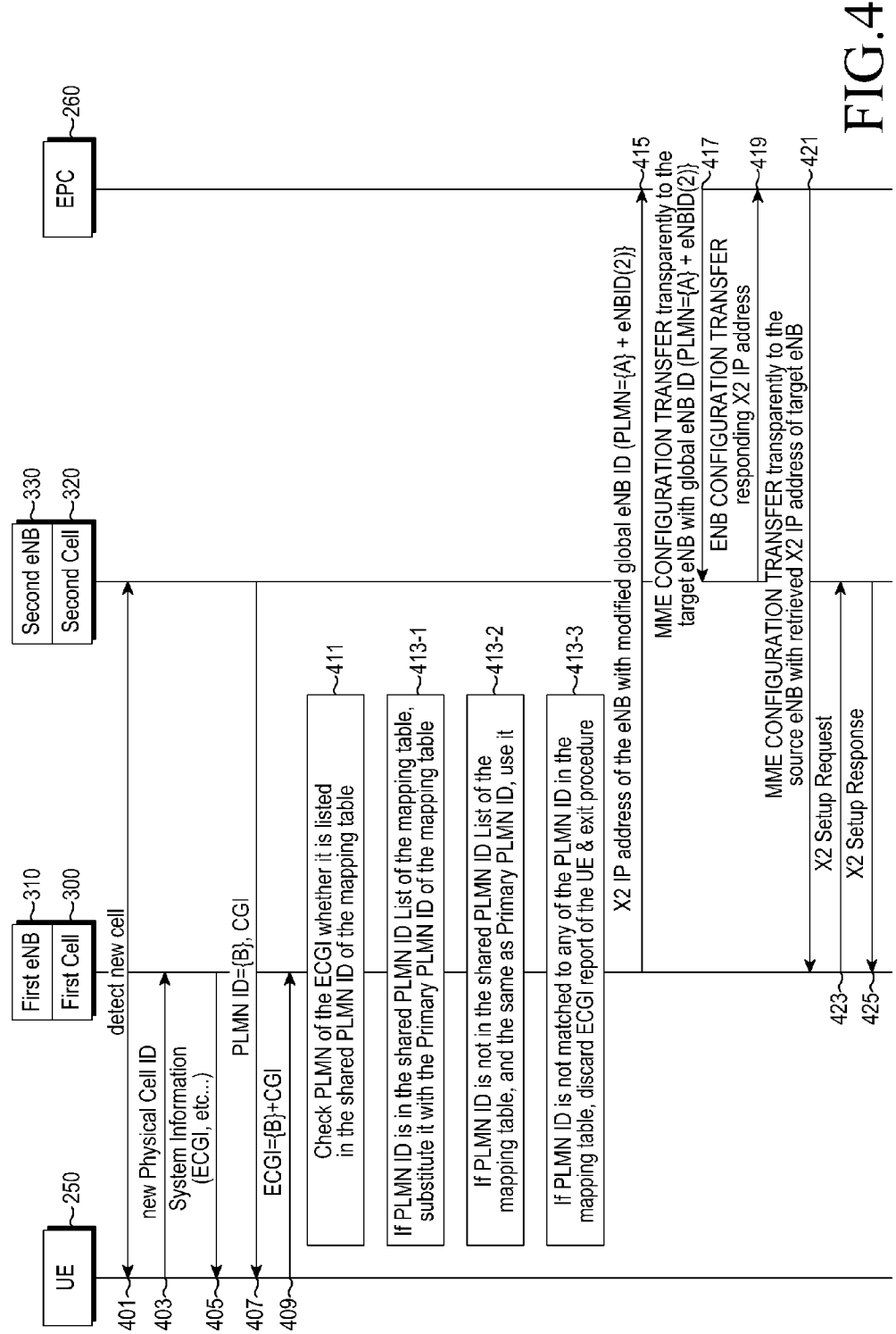

METHOD AND APPARATUS FOR ACQUIRING CELL IDENTIFIER IN RADIO COMMUNICATION SYSTEM

CROSS-REFERENCE TO RELATED APPLICATION(S)

This application is a continuation application of prior application Ser. No. 14/219,314, filed on Mar. 19, 2014, which has issued as U.S. Pat. No. 9,313,724 on Apr. 12, 2016 and claimed the benefit under 35 U.S.C. §119(a) of a Korean patent application filed on Mar. 20, 2013 in the Korean Intellectual Property Office and assigned Serial number 10-2013-0029667, the entire disclosure of which is hereby incorporated by reference.

TECHNICAL FIELD

The present disclosure relates to a method and apparatus for acquiring cell identifiers in a radio communication system. More particularly, the present disclosure relates to a method and apparatus for acquiring cell identifiers in an environment where multiple operators share cells.

BACKGROUND

When an enhanced Node B (eNB) is newly or additionally installed, the eNB executes a self-configuration process. Self-configuration is an automated function for identifying a neighbor eNB, registering relationship setup, and setting up a connection to the core network in an eNB's initial boot-up process and a pre-operation phase. In other words, the self-configuration process is a method of self-collecting/analyzing the parameters needed for an eNB's initial operation.

In the self-configuration operation process, after an eNB is powered on and connected to a transport link, the eNB may perform self-detection functions after the basic self-hardware verification. The self-detection functions may include functions of detecting the transport type and the length of an antenna cable, and automatically adjusting the path of a receiver. After performing the self-detection function, the eNB may set up a physical transfer link, and acquire information about its Internet Protocol (IP) address and an IP address to a relevant service or to relevant equipment such as a serving gateway, a Mobility Management Entity (MME), a configuration server, and the like, through a connection to a Dynamic Host Configuration Protocol (DHCP)/Domain Name System (DNS) server. Upon completion of this process, the eNB may create a secure tunnel to be used for S1 and X2 links in preparation for communication with a storage server, from which the eNB can obtain a new parameter set. Neighbor relations may be optionally set through the automated functions.

Automatic Neighbor Relation (ANR) aims to minimize or remove, if possible, the operations on neighbor information when installing a new eNB and optimizing the neighbor information. The ANR function may provide an automated method of acquiring and setting neighbor information to another eNB or a neighbor cell in an eNB or a cell, to which a User Equipment (UE) is currently connected. For the purpose of handover, the ANR function may automatically set an X2 interface that supports an interface between eNBs in Long Term Evolution (LTE).

An Evolved Universal Terrestrial Radio Access (EUTRA) Cell Global ID (ECGI), a Cell Global identity (CGI), and a Global eNB ID (GEI) needed to set the X2 interface will be described with reference to the following table.

Table 1 illustrates relationships among the ECGI, CGI, and GEI.

TABLE 1

| EUTRA CELL GLOBAL ID (ECGI) | | | |
|---|---|---|---|
| PLMN ID | | CELL GLOBAL ID (28 bit) | |
| Mobile country code | Mobile network code | eNB ID (20 bit) | Cell ID (8 bit) |
| GLOBAL eNB ID | | | |
| PLMN ID | | eNB ID | |
| Mobile country code | Mobile network code | | |

The ECGI may include the CGI and the first Public Land Mobile Network ID (PLMN ID) in a Broadcast Public Land Mobile Network ID LIST (BPLMN ID LIST). The BPLMN LIST represents a list of PLMN IDs supported by the cell. Typically, the first PLMN ID may be a PLMN ID of a global eNB ID of an eNB managing the cell and the first PLMN ID may be defined as a Primary PLMN ID. The PLMN ID may include a mobile country code and a mobile network code. The CGI may include an eNB ID and a cell ID, and the cell ID and the eNB ID included in the CGI may be 8 bits and 20 bits in length, respectively. The GEI may include a PLMN ID and an eNB ID of the eNB.

For example, assuming that a first cell operates a first eNB and a second cell operates a second eNB, there is a need for a CGI included in an ECGI of the second cell and a PLMN ID of the second eNB, in order for the first cell to add and manage the second cell as its neighbor cell.

The above information is presented as background information only to assist with an understanding of the present disclosure. No determination has been made, and no assertion is made, as to whether any of the above might be applicable as prior art with regard to the present disclosure.

SUMMARY

Recently, however, an operator sharing a cell may not broadcast information about a primary PLMN ID of the shared cell in order to exclusively use the allocated frequency band. In other words, the second cell broadcasts only its own PLMN ID for an ECGI except for a PLMN ID for a global eNB ID of the second eNB. Therefore, the first cell may acquire only the PLMN ID for the ECGI of the second cell and the first cell may fail a handover operation since the first cell may recognize the PLMN ID for ECGI of the second cell as the PLMN ID for the global eNB ID of the second eNB which is needed to achieve X2 setup. That is, the PLMN ID for the ECGI of the second cell may be mistaken for the PLMN ID for the global eNB ID of the second eNB.

Accordingly, there exists a need for an improved method and apparatus for acquiring cell identifiers (or a PLMN ID for a global eNB ID of an eNB) in a radio communication system.

Aspects of the present disclosure are to address at least the above-mentioned problems and/or disadvantages and to provide at least the advantages described below. Accordingly, an aspect of the present disclosure is to provide a method and apparatus for acquiring cell identifiers in a radio communication system.

Another aspect of the present disclosure is to provide a method and apparatus for acquiring cell identifiers in an environment where multiple operators share cells, in a radio communication system.

Another aspect of the present disclosure is to provide a method and apparatus for registering neighbor relationships by acquiring cell identifiers in an environment where multiple operators share cells, in a radio communication system.

In accordance with an aspect of the present disclosure, a method for obtaining an identifier of a new cell in a radio communication system is provided. The method includes receiving information associated with the new cell from a User Equipment (UE), obtaining an Evolved Universal Terrestrial Radio Access (EUTRA) Cell Global Identifier (ECGI) of the new cell, if it is determined based on the information associated with the new cell that the new cell is not set as a neighbor cell, determining whether a Public Land Mobile Network (PLMN) Identifier (ID) (PLMN ID) in the ECGI is included in a relation table including at least one of PLMN IDs and shared PLMN IDs, and receiving an identifier of the new cell from a server, if the PLMN ID in the ECGI is included in the relation table.

In accordance with another aspect of the present disclosure, an apparatus in a radio communication system is provided. The apparatus includes a receiving unit configured to receive information associated with a new cell from a UE, and a control unit configured to obtain an ECGI of the new cell, if it is determined based on the information associated with the new cell that the new cell is not set as a neighbor cell, determine whether a PLMN ID in the ECGI is included in a relation table including at least one of PLMN ID and shared PLMN ID, and receive an identifier of the new cell from a server if the PLMN ID in the ECGI is included in the relation table.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 4 illustrates an operation process of a system according to the second embodiment of the present disclosure.

Throughout the drawings, like reference numerals will be understood to refer to like parts, components, and structures.

DETAILED DESCRIPTION

Figure 1:
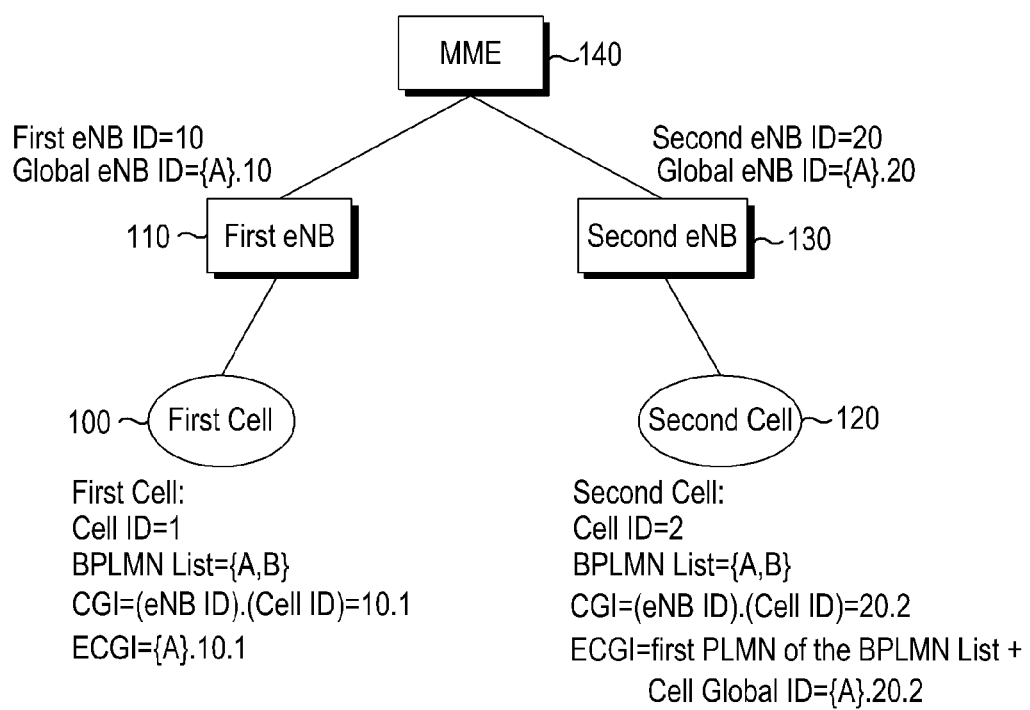
FIG. 1 illustrates relationships among an Evolved Universal Terrestrial Radio Access (EUTRA) Cell Global Identifier (ECGI), a Cell Global identity (CGI) and a Global eNB ID (GEI) according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

In this disclosure, it will be assumed that a cell can be managed to have a different PLMN ID for an ECGI from a PLMN ID for a global eNB ID.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure provides a method and apparatus for acquiring cell identifiers in a radio communication system.

In addition, the present disclosure provides a method and apparatus for acquiring cell identifiers in an environment where multiple operators share cells, in a radio communication system.

Moreover, the present disclosure provides a method and apparatus for registering neighbor relationships by acquiring cell identifiers in an environment where multiple operators share cells, in a radio communication system.

Although the cell identifier acquisition method and apparatus proposed in the present disclosure will be applied to a Long Term Evolution Advanced (LTE-A) mobile communication system in the following description, it is to be understood that this is merely by way of example and that the proposed cell identifier acquisition method and apparatus may be used not only in the LTE-A mobile communication system, but also in other cellular radio communication systems such as a High Speed Downlink Packet Access (HSDPA) mobile communication system, a High Speed Uplink Packet Access (HSUPA) mobile communication system, a Long Term Evolution (LTE) mobile communication system, a $3^{rd}$ Generation Project Partnership 2 (3GPP2) High Rate Packet Data (HRPD) mobile communication system, an Institute of Electrical and Electronics Engineers (IEEE) 802.16m mobile communication system, and the like.

In first and second embodiments of the present disclosure, a source cell will be referred to as a first cell, and a new cell (or target cell) will be referred to as a second cell.

Figure 2:
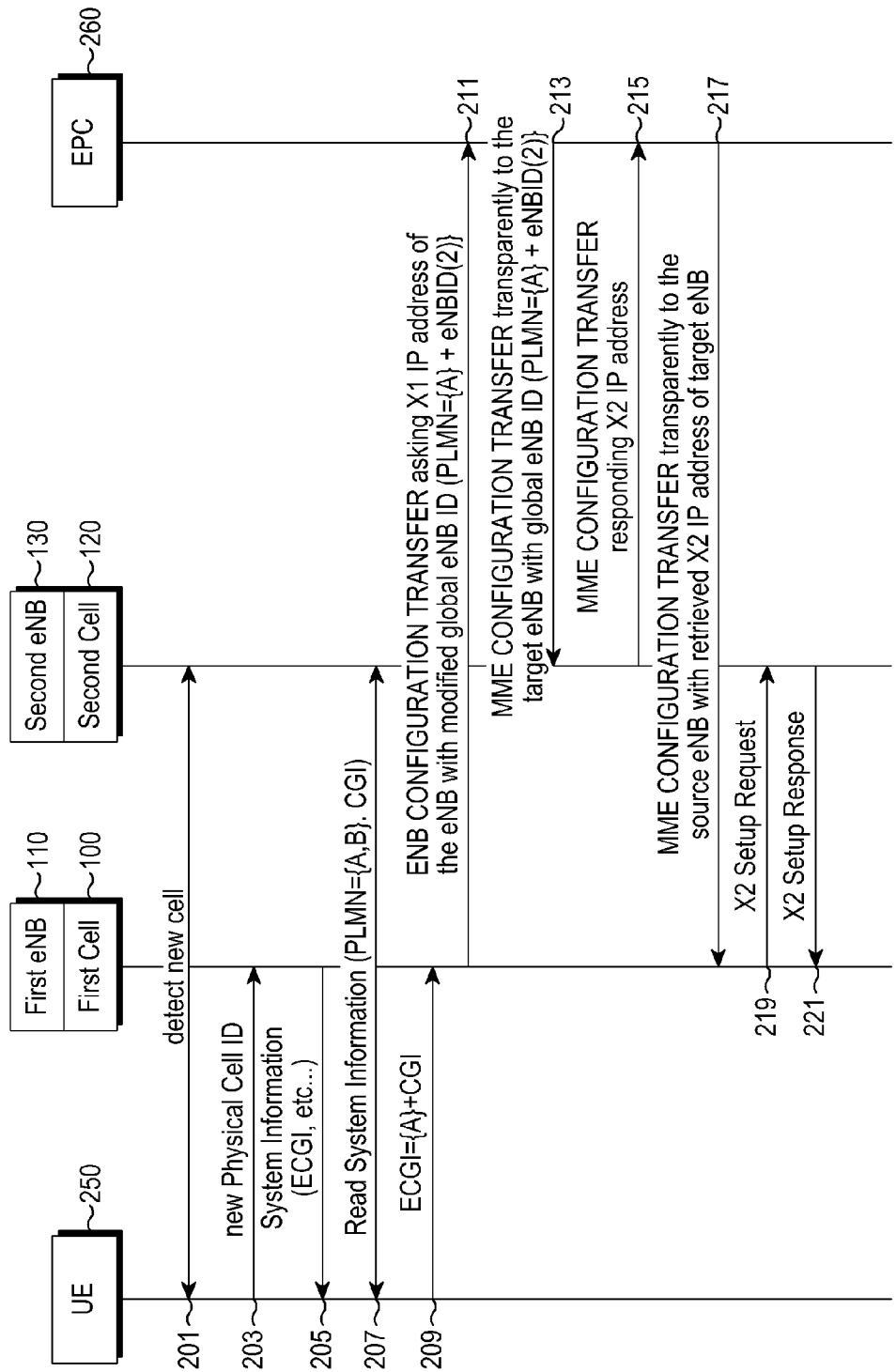
FIG. 2 illustrates an operation process of a system according to the first embodiment of the present disclosure.

It will be assumed in FIGS. 1 and 2 that first and second cells 100 and 120 and first and second eNBs 110 and 130 have the same Public Land Mobile Network Identifier (PLMN ID)=A, the first cell 100 has an ID=1, and the first eNB 110 has an ID=10. Therefore, a Cell Global Identity (CGI) of the first cell 100 is 10.1 that includes the first eNB's ID=10 and the first cell's ID=1, and an Evolved Universal Terrestrial Radio Access (EUTRA) Cell Global Identifier (ECGI) is A.10.1 that includes the first PLMN ID=A in a Broadcast Public Land Mobile Network ID LIST (BPLMN LIST) and the CGI=10.1.

In the same way, if it is assumed that an ID of the second cell 120 is 2 and an ID of the second eNB 130 is 20, a CGI of the second cell 120 is 20.2 that includes the second eNB's ID=20 and the second cell's ID=2, and an ECGI thereof is A.20.2 that includes the first PLMN ID (i.e., a primary PLMN ID)=A in the BPLMN LIST, and the CGI=20.2.

In addition, a Global eNB ID (GEI) of the first eNB 110 is A.10 that includes the primary PLMN ID=A and the first eNB's ID=10, and a GEI of the second eNB 130 is A.20 that includes the primary PLMN ID=A and the second eNB's ID=20.

FIG. 1 illustrates relationships among an ECGI, a CGI and a GEI according to a first embodiment of the present disclosure.

Referring to FIG. 1, a communication system may include the first cell 100, the first eNB 110, the second cell 120, the second eNB 130, a Mobility Management Entity (MME) 140, and a UE existing in the first cell 100. If the UE corresponds to the first cell 100 operated by the first eNB 110, the UE may newly discover the second cell 120 and acquire cell information that includes System information (SI). Since the second cell 120 broadcasts its own cell information to broadcast the currently available BPLMN LIST=(A,B) and a CGI that includes the second cell's ID=2.0 and the second eNB's ID=2, the UE, upon receiving the BPLMN LIST, may transmit the CGI=20.2 and the first PLMN ID=A to the first cell 100. Therefore, the first eNB 110 may recognize a GEI of the second eNB 130 as A.20, determining that an ECGI of the second cell 120 is A.20.2 (ECGI=A.20.2). Thereafter, the first eNB 110 may request X2 setup, using the PLMN ID=A of the second eNB 130, which is included in the recognized GEI=A.20.

FIG. 2 illustrates an operation process of a system according to the first embodiment of the present disclosure.

Referring to FIG. 2, in operation 201, a terminal 250 connected to the first cell 100 may determine or detect the presence of the second cell 120, for different cells between which an inter-eNB neighbor relationship is not set.

The second cell 120 may broadcast its own cell information that includes SI. In operation 203, the UE 250 may transmit, to the first cell 100, a Physical Cell ID (PCI), which is received through the cell information and represents a cell identifier in a physical layer.

In operation 205, the first cell 100 may send, to the UE 250, an SI request for acquiring an ECGI of the second cell 120 to additionally manage the second cell 120 as its neighbor cell, determining that a PCI for the second cell 120 is not present in a database managed by the first cell 100.

In operation 207, the UE 250 may receive a CGI that includes a second eNB's ID and a second cell's ID, and a BPLMN LIST supported by the second cell 120, by analyzing the cell information broadcasted by the second cell 120.

In operation 209, the UE 250 may transmit, to the first cell 100, the CGI that includes the second eNB's ID and the second cell's ID, and the ECGI that includes a PLMN ID supporting the second cell 120.

In operation 211, the first cell 100 may attempt to acquire an X2 IP address by transmitting, to an Evolved Packet Core (EPC) 260, a GEI that includes the second eNB's ID and a primary PLMN ID, which are acquired in operation 209. The process of attempting to acquire an IP address may use setup transfer (or S1AP ENB CONFIGURATION TRANSFER).

In operation 213, the EPC 260 may transmit the relevant IP address acquisition information to the second eNB 130 using the received GEI.

In operation 215, the second eNB 130 may transmit an IP address for its X2 to the EPC 260, if the second eNB 130 supports the first cell 100. In this case, S1AP ENB CONFIGURATION TRANSFER and MME CONFIGURATION TRANSFER may be used.

In operation 217, the first cell 100 may acquire an IP of the second eNB 130 operating the second cell 120, through the EPC 260. In operation 219, the first cell 100 may request X2 setup using the acquired X2 IP address of the second eNB 130. In operation 221, the first cell 100 may complete its operation if the second cell 120 responds to the request.

Figure 3:
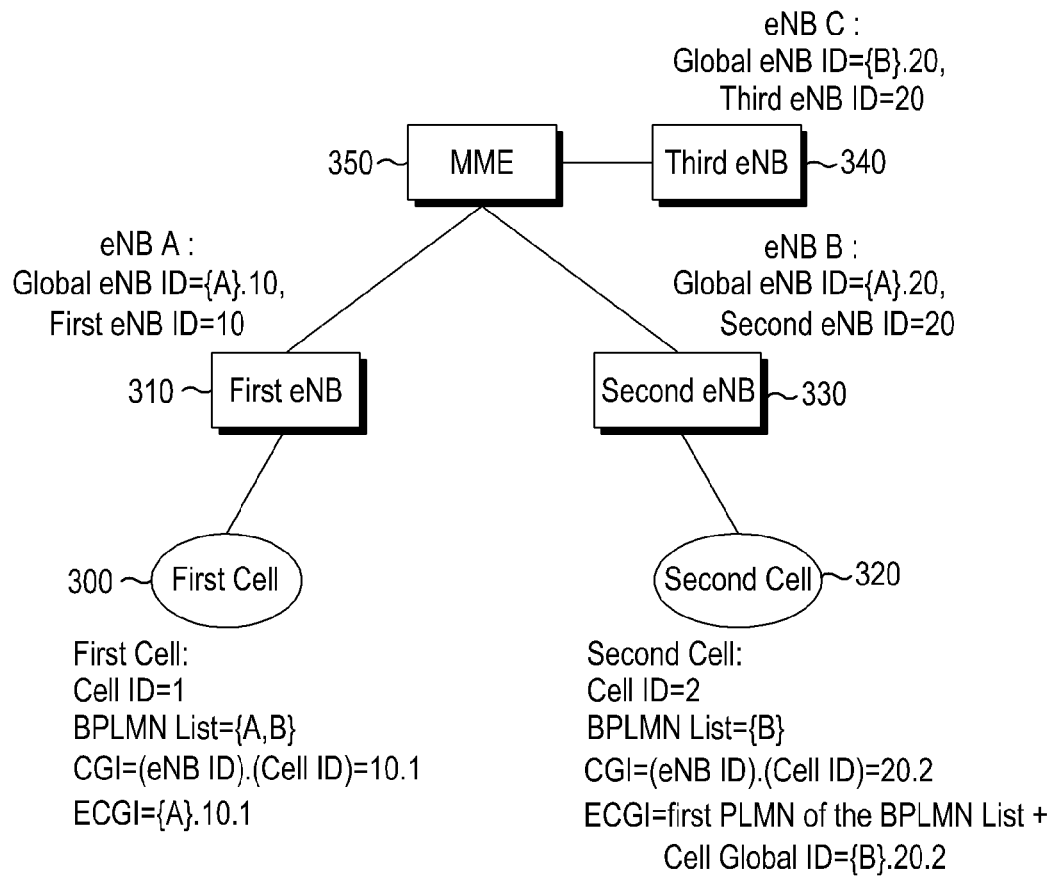
FIG. 3 illustrates relationships among an ECGI, a CGI and a GEI according to a second embodiment of the present disclosure.

Referring to FIGS. 3 and 4, a second embodiment is described. In the second embodiment, it will be assumed that a PLMN ID for a global eNB ID of a second eNB 330 is different from a PLMN ID for an ECGI of a second cell 320 in the network, and as to its broadcast cell information, the second cell 320 broadcasts only its (i.e., the second cell's) own PLMN ID for the ECGI.

It will be assumed in FIGS. 3 and 4 that a first cell 300 has an ID=1, a first eNB 310 has an ID=10, and the first cell 300 and the first eNB 310 have a PLMN ID for an ECGI=A. Therefore, a CGI is 10.1 that includes an ID=10 of the first eNB 310 and an ID=1 of the first cell 300; a GEI is A.10 that includes an ID=10 of the first eNB 310 and a PLMN ID for a global eNB ID=A of the first eNB 310; and an ECGI is A.10.1 that includes a PLMN ID for the ECGI=A of the first cell 300 and the CGI=10.1.

In the same way, it will be assumed that the second cell 320 has an ID=2, the second eNB 330 has an ID=20, the second cell 320 has a PLMN ID for an ECGI=B, and the second eNB 330 has a PLMN ID for a global eNB ID=A. Therefore, a CGI is 20.2 that includes an ID=20 of the second eNB 330 and an ID=2 of the second cell 320; a GEI is A.20 that includes an ID=20 of the second eNB 330 and a PLMN ID for the global eNB ID=A of the second eNB 330, and an ECGI is B.20.2 that includes a PLMN ID for the ECGI=B of the second cell 320 and the CGI=20.2.

In addition, it will be assumed that a third eNB 340 has an ID=20 and a GEI=B.20.

FIG. 3 illustrates relationships among an ECGI, a CGI and a GEI according to a second embodiment of the present disclosure.

Referring to FIG. 3, the system may include the first cell 300, the first eNB 310, the second cell 320, the second eNB 330, the third eNB 340, an MME 350, and a UE existing in the first cell 300.

For example, a process of performing X2 setup by the first cell 300 and the second cell 320 will be described below.

If the UE corresponds to the first cell 300 of the first eNB 310, the UE may newly discover the second cell 320 and perform SI request. Thereafter, upon receiving a BPLMN ID LIST=B that the second cell 320 is currently broadcasting, the UE may transmit a CGI=20.2 and a PLMN ID=B to the first eNB 310. In this case, the first eNB 310 may recognize even a GEI of the second eNB 330 as B.20, determining that an ECGI of the second cell 320 is B.20.2. As a result, the first eNB 310 may send an X2 setup request not to the second eNB 330, but to the third eNB 340. The X2 setup request may include a process in which the first cell 300 acquires an X2 IP address of the second cell 320.

Therefore, the first cell 300 may use a mapping table as defined in Table 2. The mapping table may represent mapping relationships between a primary PLMN (or a primary PLMN for Global eNB ID) and a shared PLMN (or a shared PLMN ID for EUTRA CGI).

TABLE 2

| Primary PLMN ID for Global eNB ID | Shared PLMN ID for EUTRA CGI |
|---|---|
| A | B |
|   | C |

When using the mapping table, the first cell 300 may determine whether the PLMN ID in the ECGI is included in the mapping table between the primary PLMN and the shared PLMN, and map the PLMN IDs depending on the determination results. Since the second cell 320 broadcasts only the currently available BPLMN ID LIST=B, the first eNB 310 may recognize a GEI of the second eNB 330 as A.20 by mapping the PLMN ID=B of the second cell 320 to A. Thereafter, based on the GEI, the first eNB 310 may recognize the second eNB 330 and request X2 setup. If a PLMN ID for a global eNB ID of a neighbor eNB does not coincide with a PLMN ID for an ECGI of the neighbor eNB's cell, the first eNB 310 may map PLMN IDs for global eNB IDs of the neighbor eNB and the cells corresponding to the neighbor eNB using the mapping table, thereby preventing errors from occurring in X2 setup.

The X2 setup request corresponds to a process in which a source cell acquires an X2 IP address of a new cell. The process of acquiring an X2 IP address will be described with reference to an operation process of FIG. 4 according to the second embodiment of the present disclosure.

FIG. 4 illustrates an operation process according to the second embodiment of the present disclosure.

Referring to FIG. 4, in operation 401, a terminal 250 connected to the first cell 300 may determine or detect the presence of the second cell 320, for different eNBs between which an inter-eNB neighbor relationship is not set.

The second cell 320 may broadcast information about its cell. In operation 403, the UE 250 may transmit, to the first cell 300, a PCI that the UE 250 has received based on the information. In other words, the UE 250 may provide information about a new cell to a source cell so that the source cell may acquire an identifier of the new cell. The information about a cell may include the cell's PCI and the system information.

Thereafter, in operation 405, determining that a PCI for the second cell 320 is not present in a database managed by the first cell 300, the first cell 300 may transmit, to the UE 250, a cell information request for acquiring an ECGI of the second cell 320 in order to additionally manage the second cell 320 as a neighbor cell.

In operation 407, the UE 250 may receive a CGI and a BPLMN ID LIST supporting the second cell 320 by analyzing cell information that is broadcasted by the second cell 320. In operation 409, the UE 250 may transmit, to the first cell 300, an ECGI that includes the CGI and the PLMN ID=B supporting the second cell 320.

In operation 411, the first cell 300 may determine whether the PLMN ID=B in the received ECGI is present in the mapping table. The mapping table may represent mapping relationships between a primary PLMN ID and a PLMN ID for shared cells in the eNB.

In operation 413-1, if the PLMN ID in the ECGI received at the first cell 300 is included in the PLMN LIST for shared cells, which is included in the mapping table, the first cell 300 may acquire a GEI by mapping the PLMN ID to the primary PLMN ID in the mapping table. In other words, the source cell may acquire a GEI of a new cell by changing the PLMN ID in the ECGI to a primary PLMN ID in the mapping table.

However, if the PLMN ID in the received ECGI is not included in the PLMN LIST for shared cells, which is included in the mapping table, the first cell 300 may determine in operation 413-2 whether the PLMN ID is present in the primary PLMN ID in the mapping table, and acquire a GEI by mapping the PLMN ID to the primary PLMN ID, if the PLMN ID is present in the primary PLMN ID in the mapping table. In other words, a source cell may determine whether the PLMN ID in the ECGI is included in the primary PLMN LIST in the mapping table, and acquire a GEI of a new cell using the PLMN ID in the ECGI, if it is determined that the PLMN ID in the ECGI is included in the primary PLMN LIST in the mapping table.

In operation 413-3, if the PLMN ID in the received ECGI is mapped to no item in the mapping table, the first cell 300 may terminate the ANR function, disregarding the ECGI. In other words, if the PLMN ID in the ECGI is not included in the mapping table, the source cell may terminate the ANR function, discarding information about the new cell.

In operation 415, the first eNB 310 may attempt to acquire an X2 IP address to the EPC using the GEI that is acquired in operation 413-1 or 413-2. Operation 415 may use S1AP ENB CONFIGURATION TRANSFER. In operation 417, the EPC may transmit IP address acquisition information for the second cell 320 to the second eNB 330 using the received GEI. In operation 419, the second eNB 330 may transmit, to the EPC, an X2 IP address for the second eNB 330, if the second eNB 330 supports the first cell. In operation 421, the EPC may transmit an X2 IP address of the second eNB 330 managing the second cell 320, to the first eNB 310. In operation 423, the first eNB 310 may request X2 setup using the acquired X2 IP address of the second eNB 330. In operation 425, the first eNB 310 may end the operation if the second eNB 330 responds to the request.

In other words, the EPC may provide the X2 IP address of a new cell to a source cell depending on whether a PLMN ID in an ECGI of the new cell different from the source cell is included in the mapping table between the primary PLMN and the shared PLMN.

Although not illustrated in the drawings, the source cell may include a receiving unit, a transmitting unit, a control unit, and a storage unit. The control unit may control the overall operation of the source cell, and the receiving unit may receive various messages from a UE, a new cell and an EPC. The transmitting unit may send various messages to the UE, the new cell and the EPC, and the storage unit may store various messages received by the receiving unit, and various programs needed to operate the source cell. For the source cell, the receiving unit, the transmitting unit, the control unit and the storage unit may be separately implemented, or the receiving unit, the transmitting unit, the control unit and the storage unit may be implemented in a single combined unit.

In addition, although not illustrated in the drawings, the new cell may include a receiving unit, a transmitting unit, a control unit, and a storage unit. The control unit may control the overall operation of the new cell, and the receiving unit may receive various messages from a UE, a source cell and an EPC. The transmitting unit may send various messages to the UE, the source cell and the EPC, and the storage unit may store various messages received by the receiving unit, and various programs needed to operate the new cell. For the new cell, the receiving unit, the transmitting unit, the control unit and the storage unit may be separately implemented, or the receiving unit, the transmitting unit, the control unit and the storage unit may be implemented in a single combined unit.

Further, although not illustrated in the drawings, the EPC may include a receiving unit, a transmitting unit, a control unit, and a storage unit. The control unit may control the overall operation of the EPC, and the receiving unit may receive various messages from a source cell and a new cell. The transmitting unit may send various messages to the source cell and the new cell, and the storage unit may store various messages received by the receiving unit, and various programs needed to operate the EPC. For the EPC, the receiving unit, the transmitting unit, the control unit and the storage unit may be separately implemented, or the receiving unit, the transmitting unit, the control unit and the storage unit may be implemented in a single combined unit.

Moreover, although not illustrated in the drawings, the UE may include a receiving unit, a transmitting unit, a control unit, and a storage unit. The control unit may control the overall operation of the UE, and the receiving unit may receive various messages from a source cell and a new cell. The transmitting unit may send various messages to the source cell and the new cell, and the storage unit may store various messages received by the receiving unit, and various programs needed to operate the UE. For the UE, the receiving unit, the transmitting unit, the control unit and the storage unit may be separately implemented, or the receiving unit, the transmitting unit, the control unit and the storage unit may be implemented in a single combined unit.

As is apparent from the foregoing description, the present disclosure may provide a method and apparatus for eliminating the restrictions that a PLMN ID of an eNB should be used as a PLMN ID of a cell during handover, thereby addressing ANR malfunctions which may occur when it is operated to block the unnecessary system information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for obtaining an identifier of a new cell in a radio communication system, the method comprising:
receiving information associated with the new cell from a user equipment (UE);
obtaining an evolved universal terrestrial radio access (EUTRA) cell global identifier (ECGI) of the new cell, if it is determined based on the information associated with the new cell that the new cell is not set as a neighbor cell;
determining whether a public land mobile network (PLMN) identifier (ID) (PLMN ID) in the ECGI is included in a relation table including at least one of PLMN ID and shared PLMN ID;
obtaining an identifier of the new cell, if the PLMN ID in the ECGI is included in the relation table.

2. The method of claim 1, further comprising:
disabling the information associated with the new cell, if the PLMN ID in the ECGI is not included in the relation table.

3. The method of claim 1, wherein the obtaining of the identifier of the new cell comprises:
if the PLMN ID in the ECGI is included in the shared PLMN ID included in the relation table, obtaining a global enhanced Node B (eNB) ID of the new cell by using a PLMN ID which is included in the relation table and corresponds to the PLMN ID in the ECGI.

4. The method of claim 1, wherein the obtaining of the identifier of the new cell comprises:
determining whether the PLMN ID in the ECGI is included in the PLMN ID in the relation table, if the PLMN ID in the ECGI is not included in the shared PLMN ID included in the relation table; and
obtaining a global enhanced Node B (eNB) ID of the new cell using the PLMN ID in the ECGI, if it is determined that the PLMN ID in the ECGI is included in the PLMN ID in the relation table.

5. The method of claim 1, wherein the information associated with the new cell includes a physical cell identifier (PCI) of the new cell and system information (SI) of the new cell.

6. The method of claim 1, wherein the identifier of the new cell is an X2 internet protocol (IP) address of the new cell.

7. The method of claim 1, wherein it is determined based on the information associated with new cell that the new cell is not set as a neighbor cell comprises:
determining the new cell as the neighbor cell if the information associated with the new cell is saved.

8. An apparatus in a radio communication system, the apparatus comprising:
a receiver configured to receive information associated with a new cell from a user equipment (UE); and
a controller configured to:
obtain an evolved universal terrestrial radio access (EUTRA) cell global identifier (ECGI) of the new cell, if it is determined based on the information associated with the new cell that the new cell is not set as a neighbor cell,
determine whether a public land mobile network (PLMN) identifier (ID) (PLMN ID) in the ECGI is included in a relation table including at least one of PLMN ID and shared PLMN ID, and
obtain an identifier of the new cell if the PLMN ID in the ECGI is included in the relation table.

9. The apparatus of claim 8, wherein the controller disables the information associated with the new cell, if the PLMN ID in the ECGI is not included in the relation table.

10. The apparatus of claim 8, wherein if the PLMN ID in the ECGI is included in the shared PLMN ID included in the relation table, the controller obtains a global enhanced Node B (eNB) ID of the new cell by using a PLMN ID which is included in the relation table and corresponds to the PLMN ID in the ECGI.

11. The apparatus of claim 8, wherein the controller determines whether the PLMN ID in the ECGI is included in the PLMN IDs in the relation table, if the PLMN ID in the ECGI is not included in the shared PLMN ID included in the relation table, and obtains a global enhanced Node B (eNB) ID of the new cell using the PLMN ID in the ECGI, if it is determined that the PLMN ID in the ECGI is included in the PLMN ID in the relation table.

12. The apparatus of claim 8, wherein the information associated with the new cell includes a physical cell identifier (PCI) of the new cell and system information (SI) of the new cell.

13. The apparatus of claim 8, wherein the identifier of the new cell is an X2 internet protocol (IP) address of the new cell.

14. The apparatus of claim 8, wherein the controller determines the new cell as the neighbor cell if the information associated with the new cell is saved.

\* \* \* \* \*